United States Patent [19]

Kania et al.

[11] Patent Number: 4,965,317

[45] Date of Patent: Oct. 23, 1990

[54] COATING COMPOSITION WITH SAG CONTROL AGENT

[75] Inventors: Charles M. Kania, Natrona Heights; Carl C. Anderson, Allison Park; Brij N. Sharma, Pittsburgh, all of Pa.

[73] Assignee: PPG Industries, Inc., Pittsburgh, Pa.

[21] Appl. No.: 422,166

[22] Filed: Oct. 16, 1989

[51] Int. Cl.$^5$ ................... C08L 61/00; B32B 27/00
[52] U.S. Cl. ................... 525/155; 525/162; 428/423.1; 428/425.8; 524/507; 524/512
[58] Field of Search ................... 525/155, 162; 428/423.1, 425.8; 524/507, 512

[56] References Cited

U.S. PATENT DOCUMENTS

| | | | |
|---|---|---|---|
| 3,966,667 | 6/1976 | Sullivan et al. | 260/33.6 UA |
| 4,147,688 | 4/1979 | Makhlouf et al. | 260/33.6 EP |
| 4,311,622 | 1/1982 | Buter | 260/18 EP |
| 4,677,028 | 6/1987 | Heeringa et al. | 428/422.8 |

*Primary Examiner*—John C. Bleutge
*Assistant Examiner*—Vasu S. Jagannathan
*Attorney, Agent, or Firm*—Daniel J. Long

[57] ABSTRACT

An improved coating composition comprising (a) a binder; and (b) a polyurea sag control agent characterized in that the polyurea sag control agent is a urea functional free radical addition polymer.

16 Claims, No Drawings

COATING COMPOSITION WITH SAG CONTROL AGENT

BACKGROUND OF THE INVENTION

1. Field of the Invention

The present invention relates to coating compositions based on a polymeric film forming binder and having a sag control agent and particularly to high solids coating compositions based on film forming acrylic polymers and having a sag control agent.

2. Brief Description of the Prior Art

Acrylic polymers are well known in the art as polymeric binders for coating compositions. The acrylic polymers provide for hardness, gloss and exterior durability in the resultant coating making them particularly desirable as finishes for automobiles. The acrylic polymers may be thermoplastic or thermosetting in nature. For thermosetting polymers, the alpha, beta-ethylenically unsaturated monomer component usually includes an active hydrogen-containing monomer such as a hydroxy-containing monomer and the resulting polymer is combined with a curing agent such as a polyisocyanate or aminoplast resin to form a curable or thermosetting composition.

The coating compositions can be formulated with high molecular weight acrylic polymers. However, such polymers require the presence of relatively high amounts of organic solvent to reduce the viscosity of the polymer sufficiently for coatings applications. The high concentration of organic solvent results in air pollution problems. To avoid these problems, there has been a trend in the coatings industry to develop so-called high solids coatings which contain relatively low amounts of organic solvent. The polymers in such high solids compositions are of relatively low molecular weight so that the polymer will have a low viscosity and will not require large concentrations of organic solvent for coatings application. Such high solid compositions, however, have a tendency to sag on application and when baked.

It is disclosed in U.S. Pat. Nos. 3,966,667 and 4,147,688 that such sagging may be reduced by incorporating a microgel polymer in the coating composition. The disadvantage of such treatment, however, is that it may render the cured coating rough in appearance, giving a so-called "orange peel" appearance, particularly on vertical surfaces. Further, the coating containing the microgel polymer may also be milky or yellow in appearance when used in clear coat applications.

U.S. Pat. No. 4,311,622 discloses a crystalline sag control agent which is the reaction product of a diisocyanate and a monamine or hydroxy monoamine. U.S. Pat. No. 4,677,028 discloses a crystalline polyurea sag control agent which is formed by the reaction of an isocyanurate trimer and a primary amine either in situ in the coating composition or externally and then added to the coating composition. While these crystalline sag control agents are reported to reduce roughness in the resultant coating, they may also be visually detectable when used in a clear coat.

It is, therefore, the object of the present invention to provide a sag control agent preferably for clear coating compositions which allows for smoothness on vertical surfaces while maintaining clarity and non-yellowing in the resultant coating.

SUMMARY OF THE INVENTION

In the present invention, a polyurea sag control agent is added to a paint binder. This sag control agent is an amorphous urea functional free radical addition polymer and is preferably the reaction product of an isocyanate functional acrylic polymer and a primary or secondary amine. This sag control agent is used in an amount of 8 to 10 percent by weight in a high solids melamine cured acrylic polyol system. The sag control agent is of particular usefulness when it is incorporated into a clear coat.

DETAILED DESCRIPTION

The polymeric film forming binder used in the coating composition of the present invention can be any reactive polymer, that is a polymer which is capable of further reaction with itself or with an added curing agent to form a crosslinked product. A preferred example of a reactive polymer is a reactive acrylic polymer which is formed by reacting from 10 to 60 percent by weight of a polymerizable alpha, beta-ethylenically unsaturated monomer containing a functional group which participates in the curing of the composition. Also included in the monomer component is from about 40 to 90 percent by weight of a polymerizable alpha, beta-ethylenically unsaturated monomer component free of functional groups. The acrylic polymer is typically prepared in an organic solvent by conventional solution polymerization techniques, although aqueous emulsion, non-aqueous dispersion and bulk polymerization techniques can be used.

Examples of alpha, beta-ethylenically unsaturated monomers containing functional groups are monomer containing active hydrogens, which are preferred, such as hydroxyl, which is most preferred, amino and carboxylic acid, as well as N-methylol including alkylated derivatives thereof, and epoxy.

Examples of monomers containing hydroxyl groups include hydroxyalkyl esters of acrylic or methacrylic acid containing from 2 to 4 carbon atoms in the alkyl group such as hydroxyethyl acrylate, hydroxyethyl methacrylate, hydroxypropyl acrylate and hydroxypropyl methacrylate. Also, hydroxyl group-containing monomers such as the reaction product of hydroxyethyl acrylate and epsilon-caprolactone can be used.

Examples of amine group-containing monomers are t-butylaminoethyl acrylate, t-butylaminoethyl methacrylate and aminoethyl methacrylate.

Examples of carboxylic acid group-containing monomers are acrylic acid, methacrylic acid, crotonic acid and itaconic acid.

Examples of N-methylol group-containing monomers are N-methylol acrylamide and N-methylol methacrylamide. Also, equivalents of N-methylol group-containing monomers, i.e., alkylated derivatives of these monomers may be used such as N-alkoxymethyl acrylamide and N-alkoxymethyl methacrylamide in which the alkoxy group contains from 1 to 4 carbon atoms. Specific examples include N-butoxymethyl acrylamide and N-ethoxymethyl methacrylamide.

Examples of epoxy group-containing monomers include glycidyl acrylate and glycidyl methacrylate.

As mentioned above, the functional groups participate in the curing reaction. In the case of functional groups such as hydroxyl, amino, carboxylic acid and epoxy, an externally added curing agent such as a polyisocyanate, an aminoplast, a polyepoxide or a polyacid curing agent should be present. In the case of N-methylol groups or their alkylated derivatives, an external curing agent is not necessary since these groups are self-curing.

The amount of the functional monomer which is used is from about 10 to 60, preferably 25 to 50 percent by weight, based on total weight of alpha, beta-ethylenically unsaturated monomers, and is sufficient to form a cured coating.

Besides the alpha, beta-ethylenically unsaturated monomers containing a functional group, other copolymerizable monomers which do not contain functional groups are also used. Examples of these monomers include vinly aromatic compounds such as styrene and vinyl toluene; alkyl esters of acrylic and methacrylic acid containing from 1 to 20 carbon atoms in the alkyl group such as methyl methacrylate, ethyl acrylate, butyl acrylate, 2-ethylhexyl acrylate and lauryl methacrylate; acrylic monomers containing amido groups such as acrylamide and methacrylamide. Examples of other polymerizable alpha, beta-ethylenically unsaturated monomers are vinyl halides such as vinyl chloride and vinylidene fluoride; vinyl nitriles such as acrylonitrile and methacrylonitrile; vinyl esters such as vinyl acetate and vinyl propionate.

The amount of alpha, beta-ethylenically unsaturated monomer free of functional groups is from 40 to 90, preferably 50 to 75 percent by weight, based on total weight of polymerizable alpha, beta-ethylenically unsaturated monomers.

As mentioned above, the acrylic polymers used in the coating of the present invention are typically prepared in organic solvent by free radical solution polymerization techniques well known in the art. Typically, the monomers, free radical initiator compound, and chain transfer agent, are added in a controlled manner to a refluxing organic solvent. After addition is complete, additional free radical initiator compounds may be added to complete the reaction.

The organic solvent is a high boiling solvent, preferably one which has a boiling point at atmospheric pressure of at least 130° C., preferably 150° to 185° C., and the reaction is preferably conducted under refluxing conditions. Examples of preferred solvents are esters of the structure:

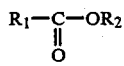

where $R_1$ is straight or branched chain alkl of 1 to 6 carbon atoms and $R_2$ is straight or branched chain alkyl of 1 to 7 carbon atoms and $R_1$ plus $R_2$ contains at least 6 carbon atoms. Specific examples of suitable solvents of this type include hexyl acetate and heptyl acetate.

Examples of other solvents which can be used in the practice of the invention include ketones such as methyl amyl ketone and glycol ethers such as 2-butoxyethanol, propylene glycol monoethyl ether; alcohols such as benzyl alcohol; esters such as 2-butoxyethyl acetate, 1-ethyl-3-ethoxy-3-propionate and aromatics such as mixtures of aromatic compounds such as those available under the trademark SOLVESSO 100. The amount of organic solvent which is used will range from 10 to 50, preferably 20 to 40 percent by weight, based on total weight of monomers and organic solvent.

The free radical initiator which can be used are peroxides such as a t-amylperoxy compound such as 1,1-di(t-amylperoxy)cyclohexane, also t-amylperoxy esters such as t-amylperoxy, ethyl-3,3-di(t-amylper-oxy)butyrate, and t-amylperoxyacetate, other peroxides such as di-t-butylperoxide, dicumylperoxide, cumenehydroperoxide, and t-butylperbenzoate and azo compounds such as 2,2'-azobis(2-methylbuty-ronitrile) which is available as VAZO-67 from E. I. du Pont de Nemours & Co., Inc. The amount of free radical initiator that is used will vary in amounts from about 1 to 10, preferably 2 to 8 percent by weight, based on total weight of polymerizable alpha, beta-ethylenically unsaturated monomers.

In addition to the alpha, beta-ethylenically unsaturated monomers mentioned above, chain transfer agents may be used during the polymerization. Chain transfer agents or chain terminators regulate the molecular weight of the acrylic polymer.

Examples of such chain transfer agents are mercaptans, halocompounds, 2,4-diaryl-1-alkenes, such as 2,4-di-phenyl-4-meth-yl-1-pentenes and the like. The amount of chain transfer agent will vary from 1 to 20, preferably 5 to 15 percent by weight based on total weight of alpha, beta-ethylenically unsaturated monomers. Amounts less than 1 percent by weight are undesirable because the resulting polymer will have an undesirably high molecular weight; whereas amounts greater than 20 percent by weight result in broadening of the molecular weight distribution.

Preferably, the acrylic polymers used in the coating composition of the present invention will have low molecular weights and narrow molecular weight distributions, typically weight average molecular weights of less than 6000, more preferably about 2000 to 5000, and molecular weight distributions ($M_w/M_n$) of less than 2.5, usually about 1.9 to 2.5. The molecular weight is determined by gel permeation chromatography using a polystyrene standard. Thus, the numbers obtained are really polystryrene numbers; however, for the purposes of this invention, they are considered to be molecular weights.

As mentioned above, when the acrylic polymer contains a functional group which is not self-reactive, a curing agent must be used with the acrylic polymer. In the case where the functional group is active hydrogen, particularly OH, the curing agent can be an aminoplast or polyisocyanate with the aminoplast being preferred. The aminoplasts are aldehyde condensation products of amines or amides with aldehydes. Examples of suitable amines or amides are melamine, benzoguanamine, urea or similar compounds. Generally, the aldehyde employed is formaldehyde, although products can be made from other aldehydes such as acetaldehyde and furfural. The condensation products contain methylol groups or similar alkylol groups depending upon the particular aldehyde employed. If desired, these methylol groups can be etherified by reaction with an alcohol. Various alcohols are employed and generally include any monohydric alcohol, although the preferred alcohol contains from 1 to 4 carbon atoms such as methanol, ethanol, isopropanol and n-butanol. Aminoplasts are commercially available from American Cyanamid Company under the trademark CYMEL and from the Monsanto Chemical Company under the trademark RESIMENE. Additionally, the hydroxy functional polymers may be cured with polyanhydrides.

When the functional group is amine, the curing agent can be polyisocyanate or polyepoxide or polyanhydride; when the functional group is carboxylic acid, the curing agent can be polyepoxide or polyanhydride; when the functional group is epoxy, the curing agent can be polyacid or polyamine. Besides the functional acrylic polymer, the polymeric film forming can be a functional polyester or polyurethane polymer, preferably an active hydrogen containing polymer such as a hydroxyl-containing polyester or polyurethane. Examples of such film forming polymers are described in U.S. Pat. Nos. 4,025,474 and 4,115,472, the contents of which are incorporated by reference.

The preparation of the sag control agent is carried out by the reaction of an isocyanate functional acrylic polymer with a primary or secondary amine to produce a urea functional acrylic polymer. Isocyanate functional materials can be prepared by free radical polymerization of ethylenically unsaturated monomers of which one of the monomers bears an isocyanate functional group such as alpha, alpha-dimethyl isopropenyl benzyl isocyanate, isocyanate ethyl methacrylate, d-isocyanates half capped with a hydroxy (meta) acrylate and the like. Alternatively, the isocyanate functionality can be derived by the reacting of sterically hindered amide polymers with sodium hypochlorite as is described in U.S. Pat. No. 3,929,744. The isocyanate functional polymers are then reacted with a primary or secondary amine to produce this urea modification. Using an acrylamide copolymer with styrene for illustrative purposes, the reaction with sodium hypochlorite proceeds as follows:

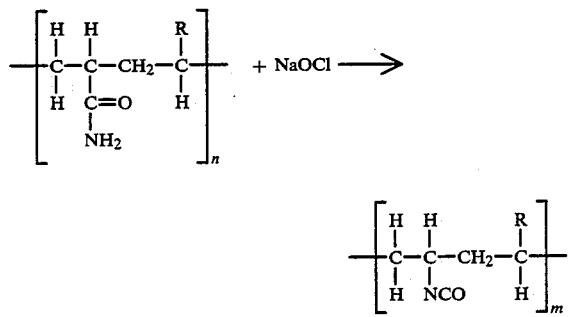

where R is phenyl and n is an integer. The corresponding product using a copolymer of methacrylamide with styrene can be shown as follows:

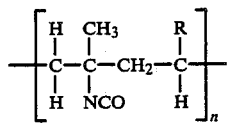

Examples of primary amines would include benzylamine, ethylamine, n-propylamine, sec propylamine, n-butylamine, sec. butylamine, tert. butylamine, n-pentylamine, alpha-methylbutylamine, alpha-ethylpropylamine, beta-ethylbutamine, hexylamine, octylamine, decylamine, stearylamine, cyclohexylamine, aniline and hexamethylene diamine. Examples of suitable secondary amines would include dibutylamine, diethylamine, diisopropylamine, diethanolamine, and diisopropanolamine. These amines would generally contain not more than 30 carbon atoms and preferably 1 to 18 carbon atoms. Amines containing one or more primary or secondary amino groups and one or more ether and/or hydroxyl groups are also applicable. For example, ethanolamine, 6-aminohexanol, p-methoxybenzylamine, methoxypropylamine, 3,4-dimethoxyphenyl-ethylamine, 2,5-dimethoxyaniline, furfurylamine, tetrahydrofurfurylamine may be used. Mixture of the amines referred to above may also be used.

In the reaction between the isocyanate and the amine for preparing the sag control agent, generally the isocyanate and the amine are used in stoichiometric amounts.

The reaction between the isocyanate and the amine may generally be carried out in any arbitrarily chosen way by combining the reaction components, optionally at elevated temperature. It is preferred that the reaction should be carried out at a temperature in the range of 20° to 120° c., more particularly in the range of 25° to 95° c. In general, the amine is added directly to the isocyanate functional polymer at the desired reaction temperature optionally in the presence of catalyst such as a tin compound. The reaction proceeds until the isocyanate has been completely consumed.

The sag control agent is present in the coating composition typically in amounts of 1 to 25 percent by weight of the coating composition and preferably 8 to 10 percent by weight based on total binder solids.

The coating compositions of this invention are of high solids type, that is, they are sprayable at high solids content. The sprayability is the maximum concentration of solids at which the coating composition can be atomized sufficiently to form a uniformly deposited coating, under normal spraying conditions of, say, temperature, pressure, and spray equipment design such as entails the use of an air suction spray gun operating at 60 psi with a No. 30 air cap. This maximum concentration is solvent dependent and usually occurs in a viscosity range of 15–30 seconds with a No. 4 Ford cup at room temperature after thinning with an organic solvent. Above this maximum concentration, appearance, leveling and solvent popping typically become unacceptable. With the high solids, the desired coating thickness and appearance is obtained without enumerable coating applications. Additionally, coating compositions of this type meet air pollution standards which require a reduction of organic solvent emissions of today's organic solvent-based coating compositions.

The coatings of the present invention can be applied to substrates such as automobiles and the like using conventional methods of application such as spray coating including electrostatic spray coating. Other methods of application such as roller coating, dipping or brushing may also be used. Preferably, the coatings of the present invention are applied as high solids clear coatings over colored or pigmented basecoats.

After application, the coating compositions are usually cured at a temperature of from about 75° to 250° C., preferably from about 80° to 125° C. for about 15 to 45 minutes. The curing temperature will depend upon the particular curing mechanism used.

Besides the polymeric binder and sag control agent, the coating compositions of the present invention can contain optional ingredients well known in the art in the formulation of coating compositions such as plasticizers, curing catalysts, anti-oxidants, UV absorbers and stabilizers, flow control agents, and, if desired, pigment, typically in the form of a pigment paste. The ingredients are usually mixed together with low shear mixing and then with solvent if necessary to get the proper viscosity for coating application, that is, a No. 4 Ford cup viscosity of 15 to 28 seconds. Preferably, the coating compositions are of the high solids type having a resins solids content of at least 45, preferably from 55 to 80 percent by weight based on total weight of resin solids.

The process and compositions of the invention can be further illustrated by reference to the following examples wherein parts are parts by weight unless otherwise indicated.

EXAMPLE A

A polyurea sag control agent was formed from the following ingredients:

| Ingredient | Parts by Weight (grams) |
|---|---|
| Initial Charge | |
| Xylene | 576.0 |
| Charge I | |
| m-TMI[1] | 224.0 |
| Butyl methacrylate | 739.2 |
| Butyl acrylate | 739.2 |
| Methyl methacrylate | 537.6 |
| Charge II | |
| Xylene | 297.6 |
| LUPERSOL 555-M60[2] | 186.7 |
| Charge III | |
| LUPERSOL 555-M60 | 14.93 |
| Charge IV | |
| LUPERSOL 555-M60 | 14.93 |
| Charge V | |
| Diisopropanolamine | 147.6 |

[1] m-TMI is m-isopropenyl dimethylbenzyl isocyanate available from American Cyanamid Co.
[2] LUPERSOL 555-M60 is t-amylperoxy acetate 60 percent by weight solution in odorless mineral spirits available from Pennwalt Corp.

The initial charge was added to a 5L round-bottom 4-neck flask equipped with a condenser, stirrer, thermometer, nitrogen sparge and addition funnels. The Initial Charge was heated to reflux (138° C.). At reflux Charges I and II were metered uniformly into the reactor over a 3 hour period maintaining reflux conditions. When Charges I and II were complete, Charge III was added and the reaction held one hour. Then Charge IV was added and the reaction held an additional one hour. The reaction was cooled to 26° C. At this temperature Charge V was added to the reactor over one hour and then held one hour at 38-34° C. The reaction was considered complete when no NCO peak was observed by Infrared Analysis. The product was characterized as follows:
Solids—70.7%
NCO value—infinity
Viscosity—16.2 stokes
Acid Value—0.168
Hydroxy Value—35.3
GPC Peak Molecular Weight—4839,

EXAMPLE B

Another polyurea sag control agent was formed from the following ingredients:

| Ingredient | Parts by Weight (grams) |
|---|---|
| Initial Charge | |
| Hexyl acetate | 576.0 |
| Charge I | |
| m-TMI | 448.0 |
| Butyl acrylate | 582.4 |
| Butyl methacrylate | 604.8 |
| Methyl methacrylate | 380.8 |
| Methylstyrene dimer | 224.0 |
| Charge II | |
| Hexyl acetate | 297.6 |
| LUPERSOL 555-M60 | 186.7 |
| Charge III | |
| LUPERSOL 555-M60 | 14.9 |
| Charge IV | |
| LUPERSOL 555-M60 | 14.9 |
| Charge V | |
| t-butylamine | 163.0 |

The procedure for making the sag control agent was the same as in Example A except the reflux conditions in preparing the acrylic were 115-143° C. The product was characterized as follows:
Solids—66.8%
NCO value—infinity
Viscosity—9.6 stokes
GPC Peak Molecular Weight—1947,

EXAMPLE C

| Ingredient | Parts by Weight (grams) |
|---|---|
| Initial Charge | |
| Hexyl acetate | 576.0 |
| Charge I | |
| m-TMI | 672.0 |
| Butyl acrylate | 515.2 |
| Butyl methacrylate | 515.2 |
| Methyl methacrylate | 313.6 |
| Methylstyrene dimer | 224.0 |
| Charge II | |
| Hexyl acetate | 297.6 |
| LUPERSOL 555-M60 | 186.7 |
| Charge III | |
| LUPERSOL 555-M60 | 14.9 |
| Charge IV | |
| LUPERSOL 555-M60 | 14.9 |
| Charge V | |
| t-butylamine | 244.0 |

The procedure for making the sag control agent was the same as in Example B. The product was characterized as follows:
Solids —65.5%
NCO value —infinity
Viscosity —35.9 stokes
GPC Peak Molecular Weight —1881,

EXAMPLE D

An acrylic polyol was formed from the following ingredients:

| Ingredient | Parts by Weight (grams) |
|---|---|
| Initial Charge | |
| Xylene | 10.7 |
| SOLVESSO 100 | 10.7 |
| Isobutanol | 4.285 |
| Charge I | |
| Hydroxypropyl acrylate | 40.0 |
| Butyl methacrylate | 19.0 |
| Butyl acrylate | 19.0 |
| Styrene | 20.0 |
| Acrylic acid | 2.0 |
| t-dodecyl mercaptan | 0.5 |
| Charge II | |
| Xylene | 8.57 |
| SOLVESSO 100 | 6.43 |
| VAZO 67[3] | 5 |

-continued

| Ingredient | Parts by Weight (grams) |
|---|---|
| Charge III | |
| SOLVESSO 100 | 1.07 |
| VAZO 67 | 0.4 |
| Charge IV | |
| SOLVESSO 100 | 1.07 |
| VAZO 67 | 0.4 |

[3]VAZO 67 is 2,2'-dimethylazobis(isobutyronitrile) available from E. I. du Pont de Nemours & Co., Inc.

The initial charge was added to a 5-liter round bottom 4-neck flask equipped with mechanical agitation, nitrogen inlet, reflux condenser and two dropping funnels (using a nitrogen blanket). The charge is heated to reflux (115° C.). At reflux, Charges I and II are simultaneously and uniformly added over a two hour period maintaining reflux conditions. Upon completion of Charges I and II, Charge III is added and the reaction held for one hour. Charge IV is added and the reaction held one more hour. The polymer is characterized as follows:
  Solids —69%
  Viscosity —45 stokes
  Hydroxy value —95
  GPC peak molecular weight —7000,

EXAMPLE E

A base mix for a clear coating was made from the following ingredients:

| Ingredient | Parts by Weight | Solids |
|---|---|---|
| TINUVIN 328[4] | 3.0 | 3.0 |
| Hexyl acetate | 7.5 | |
| Butyl acetate | 7.5 | |
| RESIMENE 757[5] | 50.0 | 50.0 |
| Acrylic polyol of Example D | 57.1 | 40.0 |
| Ethyl alcohol | 6.0 | |
| Dodecyl benzene sulfonic acid | 1.4 | 1.0 |
| TINUVIN 292[6] | 0.4 | 0.35 |
| Polybutyl acrylate | 0.8 | 0.5 |

[4]TINUVIN 328 is a 2-[2'-hydroxy-3',5'-(di-t-amyl)-phenyl] benzotriazole UV absorber available from Ciba-Geigy Company.
[5]RESIMENE 757 is a methylated, butylated melamine available from Monsanto Chemical Company.
[6]TINUVIN 292 is a bis(1,2,2,6,6-pentamethyl-1,4-piperidinyl) sebacate light stabilizer available from Ciba-Geigy Company.

COMPARATIVE EXAMPLE 1

A clear coating was made by homogeneously mixing the following ingredients:

| Ingredient | Parts by Weight | Solids |
|---|---|---|
| Base mix of Example E | 133.7 | 94.85 |
| Acrylic polyol of Example D | 14.3 | 10.0 |

EXAMPLE 2

A clear coating with a polyurea sag control agent was made by homogeneously mixing the following ingredients:

| Ingredient | Parts by Weight | Solids |
|---|---|---|
| Base mix of Example E | 133.7 | 94.85 |
| Polyurea sag control agent of Ex. A | 14.0 | 10.0 |

EXAMPLE 3

Another clear coating with a polyurea sag control agent was made by homogeneously mixing the following ingredients:

| Ingredient | Parts by Weight | Solids |
|---|---|---|
| Base mix of Example E | 133.7 | 94.85 |
| Polyurea sag control agent of Ex. B | 14.0 | 10.0 |

EXAMPLE 4

Another clear coating with a polyurea sag control agent was made by homogeneously mixing the following ingredients:

| Ingredient | Parts by Weight | Solids |
|---|---|---|
| Base mix of Example E | 133.7 | 94.85 |
| Polyurea sag control agent of Ex. C | 14.0 | 10.0 |

TEST

A coating of EP-4[7] primer was applied to each of five zinc phosphated smooth, cold rolled, steel panels and then cured after which a coating of HUBC 33600[8] was applied and cured. With these panels in the vertical position, the clear coatings with polyurea sag control agents prepared in Examples 2, 3 and 4 were each sprayed on a separate panel. For comparison purposes, the clear coating without sag control agent prepared in Example 1 and DCT 2006[9], a state of the art commercial clear coating with sag control agent, were sprayed on the two other panels while the panels were in a vertical position. All the panels were then baked at 250° F. for 30 minutes while remaining in a vertical position. The properties of the resulting coatings are shown in the following Table I.

[7]ED-4 is a cationic electrodeposition primer available from PPG Industries, Inc.
[8]HUBC is a silver metallic high solids base coating available from PPG Industries, Inc.
[9]DCT 2006 is a clear coating available from PPG Industries, Inc. having a microparticle dispersion as a sag control agent. The microparticle dispersion is made generally in accordance with Examples I and II of U.S. Pat. No. 4,147,688.

TABLE I

| Clear Coating | Film Thickness (mils) | | Spray Viscosity #4 Ford (sec.) | Spray Solids (wt. %) | Gloss | | Depth of Image | | Sward Hardness | Appearance | | Sag Control | Non-Yellowness | Flop |
|---|---|---|---|---|---|---|---|---|---|---|---|---|---|---|
| | Base | Clear | | | Horiz. | Vert. | Horiz. | Vert. | | Horiz. | Vert. | | | |
| Ex. 1 | .73 | 2.4 | 21.8 | 57.3 | 96.5 | 93.9 | 85 | 65 | 38 | Excellent | Poor | Poor | Excellent | Poor |
| DCT 2006 | .75 | 2.4 | 20.5 | 57.0 | 96.9 | 93.6 | 85 | 55 | 38 | Very Good | Poor | Excellent | Poor | Excellent but milky |
| Ex. 2 | .73 | 2.2 | 23.1 | 58.5 | 95.5 | 96.8 | 90 | 75 | 28 | Excel- | Excel- | Very | Excel- | Excellent |

TABLE I-continued

| Clear Coating | Film Thickness (mils) Base | Film Thickness (mils) Clear | Spray Viscosity #4 Ford (sec.) | Spray Solids (wt. %) | Gloss Horiz. | Gloss Vert. | Depth of Image Horiz. | Depth of Image Vert. | Sward Hardness | Appearance Horiz. | Appearance Vert. | Sag Control | Non-Yellowness | Flop |
|---|---|---|---|---|---|---|---|---|---|---|---|---|---|---|
| Ex. 3 | .74 | 2.2 | 23 | 59.3 | 92 | 95.6 | 85 | 75 | 20 | Excellent | Excellent | Good Very Good | Excellent | (Bright) Excellent (Bright) |
| Ex. 4 | .71 | 2.1 | 22.6 | 58.4 | 96.5 | 93.9 | 85 | 65 | 38 | Excellent | Good | Very Good | Excellent | Excellent (Bright) |

What is claimed is:

1. An improved coating composition comprising (a) a reactive polymer film-forming binder; and (b) a polyurea sag control agent characterized in that the polyurea sag control agent is a urea functional free radical addition polymer and wherein the polyurea sag control agent is present in the amount of from about 8 to about 10 percent by weight of the composition based on the weight of resin solids.

2. The coating composition of claim 1 wherein the polyurea sag control agent is a reaction product of an isocyanate functional acrylic polymer with an amine selected from the group consisting of primary amines, secondary amines and mixtures thereof.

3. The coating composition of claim 1 which has a resin solids content of at least about 45.

4. The coating composition of claim 2 which has a resin solids content of at least about 45.

5. The coating composition of claim 2 wherein the isocyanate functional acrylic polymer is formed from the reaction of a secondary alpha-carbon or tertiary alpha-carbon acrylamide polymer having at least one $-CONH_2$ group attached directly to the secondary or tertiary carbon atom with a hypochlorite.

6. The coating composition of claim 5 wherein the isocyanate functional acrylic polymer has a weight average molecular weight of from about 3,000 to about 25,000.

7. The coating composition of claim 2 wherein the amine is diisopropanolamine.

8. The coating composition of claim 2 wherein the amine is t-butylamine.

9. The coating composition of claim 8 wherein the polymeric film-forming binder is comprised of a reactive polymer.

10. The coating composition of claim 9 wherein the polymeric film-forming binder is comprised of a reactive polymer.

11. The coating composition of claim 9 wherein the reactive polymer is an acrylic polymer.

12. The coating composition of claim 10 wherein the reactive polymer is an acrylic polymer.

13. The coating composition of claim 11 wherein the polymeric film-forming binder is a high solids melamine cured acrylic polyol system.

14. The coating composition of claim 12 wherein the polymeric film-forming binder is a high solids melamine cured acrylic polyol system.

15. The coating composition of claim 1 which is a clear coat.

16. The coating composition of claim 2 which is a clear coat.

* * * * *

UNITED STATES PATENT AND TRADEMARK OFFICE
CERTIFICATE OF CORRECTION

PATENT NO. : 4,965,317

DATED : October 23, 1990

INVENTOR(S) : Charles M. Kania et al

It is certified that error appears in the above-identified patent and that said Letters Patent is hereby corrected as shown below:

Column 12, line 21, "claim 9" should be --claim 1--.

Signed and Sealed this

Seventeenth Day of March, 1992

Attest:

HARRY F. MANBECK, JR.

*Attesting Officer*      *Commissioner of Patents and Trademarks*